(12) United States Patent
Yamamoto et al.

(10) Patent No.: US 7,108,337 B2
(45) Date of Patent: Sep. 19, 2006

(54) ROLLER FOR A CRAWLER TYPE TRAVELING VEHICLE

(75) Inventors: Teiji Yamamoto, Kadoma (JP); Tsuyoshi Yoshida, Katano (JP); Tatsuo Wada, Hirakata (JP); Kenji Kooriyama, Katano (JP)

(73) Assignee: Komatsu Ltd., (JP)

( * ) Notice: Subject to any disclaimer, the term of this patent is extended or adjusted under 35 U.S.C. 154(b) by 272 days.

(21) Appl. No.: 10/678,102

(22) Filed: Oct. 6, 2003

(65) Prior Publication Data

US 2004/0084961 A1 May 6, 2004

(30) Foreign Application Priority Data

Oct. 7, 2002 (JP) ............................. 2002-294029
Sep. 4, 2003 (JP) ............................. 2003-312367

(51) Int. Cl.
*B60C 55/14* (2006.01)
(52) U.S. Cl. ..................... 305/136; 305/129
(58) Field of Classification Search ................ 305/136, 305/137, 124, 129
See application file for complete search history.

(56) References Cited

U.S. PATENT DOCUMENTS

| 1,597,340 | A | * | 8/1926 | Best ........................ 148/529 |
| 2,080,744 | A | * | 5/1937 | Rogers ....................... 474/91 |
| 4,371,362 | A | * | 2/1983 | Dorris ........................ 474/198 |
| 5,302,012 | A | * | 4/1994 | Dester et al. ............... 305/193 |
| 6,074,023 | A | * | 6/2000 | Satou et al. ................ 305/116 |
| 6,280,009 | B1 | * | 8/2001 | Oertley ....................... 305/136 |
| 6,435,629 | B1 | * | 8/2002 | Egle et al. ................... 305/136 |
| 2002/0153773 | A1 | * | 10/2002 | Yoon ........................... 305/136 |

FOREIGN PATENT DOCUMENTS

JP U-04-78086 7/1992

* cited by examiner

*Primary Examiner*—Russell D. Stormer
(74) *Attorney, Agent, or Firm*—Rader, Fishman & Grauer PLLC

(57) ABSTRACT

To provide a roller for a crawler type traveling vehicle. The manufacture of this roller is streamlined by simplifying a structure for holding a seal mechanism between a bearing part and the outside and a thrust bearing and facilitating working while eliminating the need for welding. Roller pieces shaped to be axially separable are combined with a support shaft and formed integrally at a parting section (including a stepped engagement part and an external engagement part) by press fitting. The support shaft is provided with a projection for restraining the left and right roller pieces from moving in an axial direction.

8 Claims, 7 Drawing Sheets

ROLLER FOR A CRAWLER TYPE TRAVELING VEHICLE

TECHNICAL FIELD

The present invention relates to a roller that is supported by a body frame and disposed above a non-ground-contact side of a crawler belt for ensuring ground contact force during traveling of a vehicle, equipped with a crawler type traveling structure, such as a construction machine or a materials handling machine.

BACKGROUND ART

A conventional crawler type traveling vehicle which can travel by having a drive wheel and an idler wheel (driven wheel) disposed in front and rear positions on each side of a body frame as a lower structure and having an endless crawler belt wound around these drive and idler wheels is known as a vehicle, mainly used for work on rough terrain, such as a construction machine (e.g. a bulldozer or a hydraulic excavator), a materials handling machine or an agricultural machine. In this crawler type traveling vehicle, a plurality of rollers are placed at required intervals between the drive wheel and the idler wheel above a non-ground-contact surface of the crawler belt and is supported by the body frame for ensuring ground contact force during traveling and stably supporting a vehicle body.

Typically, as shown in FIGS. 6 and 7, such roller 50 of the crawler belt is rotatably supported on support shaft 52 via bearing bush 53. Support shaft 52 has both ends fixedly supported by large bogie 60 via respective small bogies 61. Large bogie 60 is swingably mounted to track frame (body frame) 62. Bearing bush 53 is fixedly fitted to an inner peripheral surface of roller 50 and is in contact with a rotation supporting part of support shaft 52. Accordingly, oil feeding passages 54, 54a are formed in support shaft 52 to supply lubricating oil toward a bearing surface of bearing bush 53, and oil reservoir 51 is formed inside roller 50. The lubricating oil is supplied from this oil reservoir 51 to the bearing surface, thus forming an oil film. To prevent this lubricating oil from leaking out with rotation of roller 50, seal mechanism 56 is provided between each outer face section of roller 50 and support shaft 52. A part of seal mechanism 56 that faces roller 50 is supported by seal supporting piece 57 provided at the outer face section of roller 50. For bearing axial thrust acting on roller 50, thrust bearing 58 is placed between inner surface 57a of seal supporting piece 57 and thrust bearing surface 52a of support shaft 52. Seal supporting piece 57 has a flange mounted to the outer face section of roller 50 by a plurality of bolts 59. Bolts 59 for mounting this seal supporting pieces 57 are tightened by being screwed into respective screw holes 59a of roller 50.

Another conventional roller for a tracklaying vehicle using a rubber crawler belt is disclosed, for example, in Japanese Utility Model Unexamined Publication No. H04-078086 (FIGS. 9 and 10).

As mentioned earlier, conventional roller 50 requires a plurality of screw holes 59a for mounting thrust bearing 58 and seal supporting piece 57, which forms a part of seal mechanism 56, to each of its outer face sections, thus having many problems associated with workability.

In other words, since a heavy load acts on roller 50 via crawler belt 63, roller 50 is heat-treated for increased strength of its outer peripheral surface. Making screw holes 59a before the heat treatment can be done with relative ease, but free oxides (rust) are produced on the surface of screw holes 59a by the heat treatment and need to be removed. The removal of the oxides on the plurality of screw holes 59a involves a lot of trouble and increases the cost of working. Drilling screw holes 59a after the heat treatment of roller 50 eliminates the trouble of removing the rust, but requires a drill or a tap that can drill even material having a high hardness because the roller which is heat-treated has increased hardness. Consequently, the cost of drilling increases.

The conventional rollers, including the one disclosed in Japanese Utility Model Unexamined No. H04-078086, each need to be constructed to include oil reservoir 51 for supplying the lubricating oil to the bearing part. To define oil reservoir 51, roller 50 is split into left and right pieces 50a, 50b, and these pieces 50a, 50b are joined together at an axially center section by weld a. Because of welding that is required, the cost of working increases. This inevitably leads to increased costs.

The present invention addresses such problems and aims to provide a roller for a crawler type traveling vehicle. This invention aims to streamline the manufacture of the roller by simplifying a structure for holding a seal mechanism between a bearing part and the outside and a structure for a thrust bearing and facilitating working while eliminating the need for welding.

DISCLOSURE OF THE INVENTION

To achieve the object described above, a roller for a crawler type traveling vehicle according to the present invention includes roller pieces shaped to be axially separable at a parting section, and these roller pieces are combined with a support shaft and formed integrally at the parting section by press fitting.

According to this invention, the axially separable roller pieces are constructed to fit to each other at the parting section and are formed integrally at this fitting section by press fitting with the support shaft combined with these roller pieces. With the structure thus simplified, the cost of working can be reduced considerably. It is preferable that in relation to the support shaft, a bearing bush is previously fitted to an inner periphery of the separable roller piece of the roller.

In this invention, the parting section is preferably formed of a stepped engagement part formed at one end of one of the roller pieces, and an external engagement part that is formed at one end of the other roller piece and fits on the stepped engagement part from outside. This eliminates the need for welding or making screw holes, thus allowing the reduction in the cost of working and facilitating assembly operation. Consequently, costs can be reduced.

The parting section of this invention may alternatively be formed of stepped engagement parts formed at the respective ends of the roller pieces, and these roller pieces may be formed integrally by being press-fitted to a ring member having a required width extending over the parting section. Since the separable left and right roller pieces of the same shape can be used, the variety of elements can practically be reduced, and the costs can be reduced as a result of the thus-streamlined manufacture.

Preferably, the roller pieces of the present invention each include, at a base end of the stepped engagement part, an inner flange for preventing the roller from coming off. The inner flanges formed can prevent, without fail, the roller from coming off.

To also serve as an inner flange for preventing the roller from coming off, the ring member may be shaped to project outward from a rolling contact surface and extend axially. This structure eliminates, in manufacture of a double flange roller type roller piece having outer and inner flanges, a conventional process step of removing a portion between these flanges by machining or a conventional process step of bending the inner flange by pressing after formation of a forging having an outer peripheral surface flush with an outer peripheral surface of the inner flange, thus allowing the roller piece to be produced only by forging. Since the working process can thus be simplified, the costs can be reduced. Moreover, this structure allows the ring member to have increased press fit length, whereby the ring member can have increased power for holding the roller pieces, thus enhancing the effect of preventing the roller pieces from coming off.

Preferably, the support shaft of this invention is provided with a projection for restraining the roller pieces from moving in an axial direction, and a thrust bearing is provided between an axially end face of this projection and a contact face of each of the roller pieces. With the support shaft allowed to support the thrust bearing in advance of press fitting of the roller pieces, the thrust bearing can be set in supported condition when the roller pieces are press-fitted to each other. In this way, the assembly can be facilitated.

The support shaft may be provided with a seal mechanism at its outer part, and this seal mechanism may be incorporated to have a part, which is closer to the roller piece, provided to be fitted into an outer section of the roller piece and a part, which is closer to the support shaft, held to the support shaft by a retainer. Since the seal mechanism can thus be incorporated in an outer face section of the roller, the bulk of this seal mechanism can be reduced, leaving enough space for a support shaft mounting section of the roller, and the roller can be assembled with ease. The seal mechanism mentioned here is preferably a floating seal.

BEST MODE FOR CARRYING OUT THE INVENTION

Referring to the accompanying drawings, a description will be provided hereinafter of concrete exemplary embodiments of a roller for a crawler type traveling vehicle according to the present invention.

Figure 1:
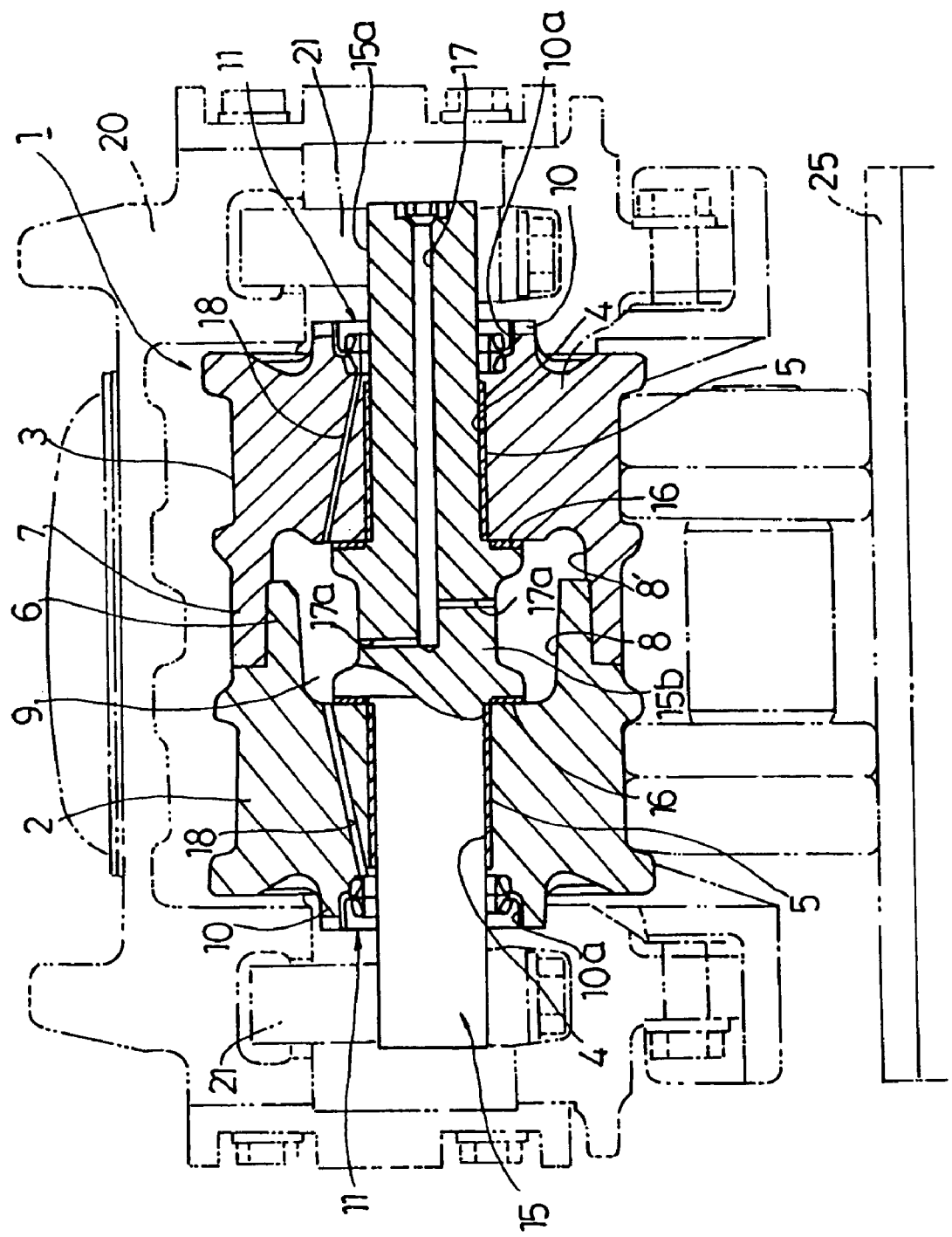
FIG. 1 is a longitudinal sectional view of a roller for a crawler type traveling vehicle in accordance with a first exemplary embodiment of the present invention.
Figure 2:
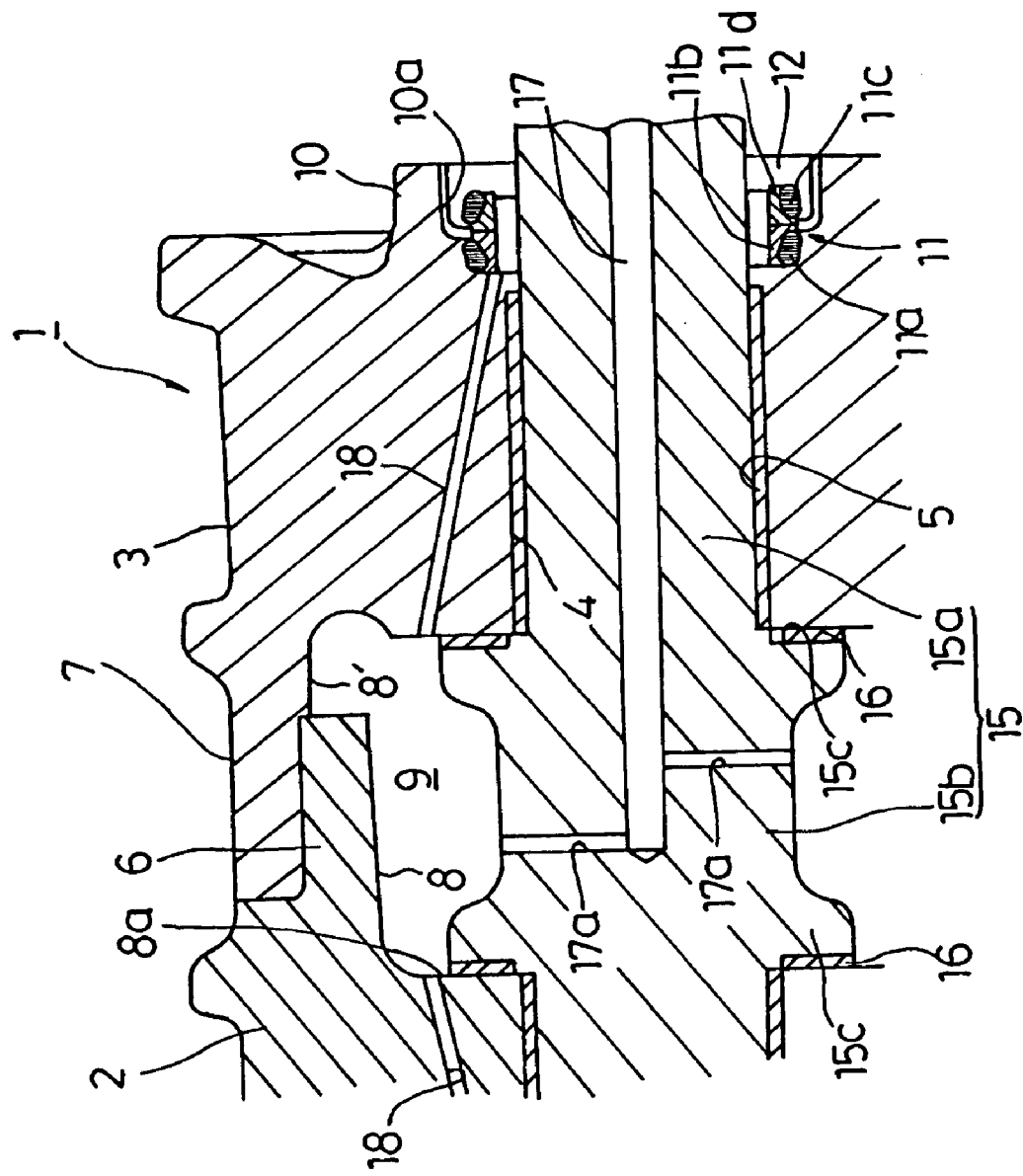
FIG. 2 is an enlarged sectional view of an essential part of the roller in accordance with the first embodiment.

FIG. 1 is a longitudinal sectional view of a roller for a crawler type traveling vehicle in accordance with the first exemplary embodiment of the present invention, and FIG. 2 is an enlarged sectional view of an essential part of the roller in accordance with this embodiment.

Roller 1 of the first embodiment includes left and right roller pieces 2, 3 separated in a direction of the width of each of roller pieces 2, 3 at a center section and also includes, in the center thereof, axially extending shaft holes 4, 4 coaxial with each other. Bearing bushes 5, 5 are fit into these shaft holes 4, 4, respectively. Roller piece 2 is formed with, at its one end, stepped engagement part (parting section) 6 having a required length, while roller piece 3 is formed with, at is one end, external engagement part (parting section) 7 which fits on stepped engagement part 6 of roller piece 2 from outside.

Respective inner peripheries 8, 8' of roller pieces 2, 3 form respective recessed parts each having a larger diameter than that of each shaft hole 4, 4, and these recessed parts cooperatively form lubricant oil reservoir 9 when roller pieces 2, 3 are combined. Coaxially with shaft hole 4, recessed part 10a is provided inside boss 10 formed on an outer end of each of roller pieces 2, 3 to be provided with floating seal (seal mechanism) 11. Floating seal 11 has, on its side closer to roller piece 2 (3), O-ring 11a and seal ring 11b that are held to roller piece 2 (3) and, on its side closer to support shaft 15, O-ring 11c and seal ring lid that are held in place by retaining ring 12 fitted on support shaft 15.

Support shaft 15 includes, at its respective end parts, support shaft parts 15a, 15a, respective ends of which are fixedly supported by large bogie 20 via respective small bogies 21, 21, and also includes an axially central section formed into large-diameter shaft part (projection) 15b having a larger diameter than that of each of support shaft parts 15a, 15a supporting respective roller pieces 2, 3. To serve as thrust bearing 16, a ring-shaped metal plate is attached to each end face 15c corresponding to a step between large-diameter shaft part 15b and support shaft part 15a. Oil feeding passages 17, 17a are formed in support shaft 15 to communicate between one end of support shaft 15 and a peripheral surface of large-diameter shaft part 15b, while oil feeding passages 18 are formed in respective roller pieces 2, 3 to each extend from inner end face 8a connecting with inner periphery 8 (8') to recessed part 10a in which floating seal 11 is fitted.

Roller pieces 2, 3 are so put together or formed integrally that external engagement part 7 of roller piece 3 is press-fitted on stepped engagement part 6 provided at the end of roller piece 2 by a press (not shown) with support shaft parts 15a, 15a fitted into respective bearing bushes 5, 5 of roller pieces 2, 3 and that thrust bearing 16 is interposed between end face 15c of large-diameter shaft part 15b of support shaft 15 and inner end face (contact face) 8a of roller piece 2 as well as between the other end face 15c and inner end face (contact face) 8a of roller piece 3 to bear thrust load at support shaft 15 during operation.

In cases where roller pieces 2, 3 are formed integrally by press fitting, the following specifications are given as an example. External engagement part 7 of roller piece 3 has an outside diameter of 300 mm and an inside diameter of 250 mm, while stepped engagement part 6 of roller piece 2 has an inside diameter of 200 mm and a press fit length of 60 mm. With an interference ranging from 0.9 mm to 1.5 mm, roller pieces 2, 3 can be formed integrally by press fitting with press fit holding power ranging from 63 to 106 tons. Roller 1 thus assembled carries a load caused by the weight of the vehicle during traveling and can guide crawler belt 25 to the ground surface.

In the first embodiment, roller pieces 2, 3 are formed integrally by press fitting. This can reduce the number of elements considerably compared with a conventional case and reduce the cost of working, which does not require welding and making screw holes and facilitates assembly operation. Consequently, costs can be reduced.

Figure 3:
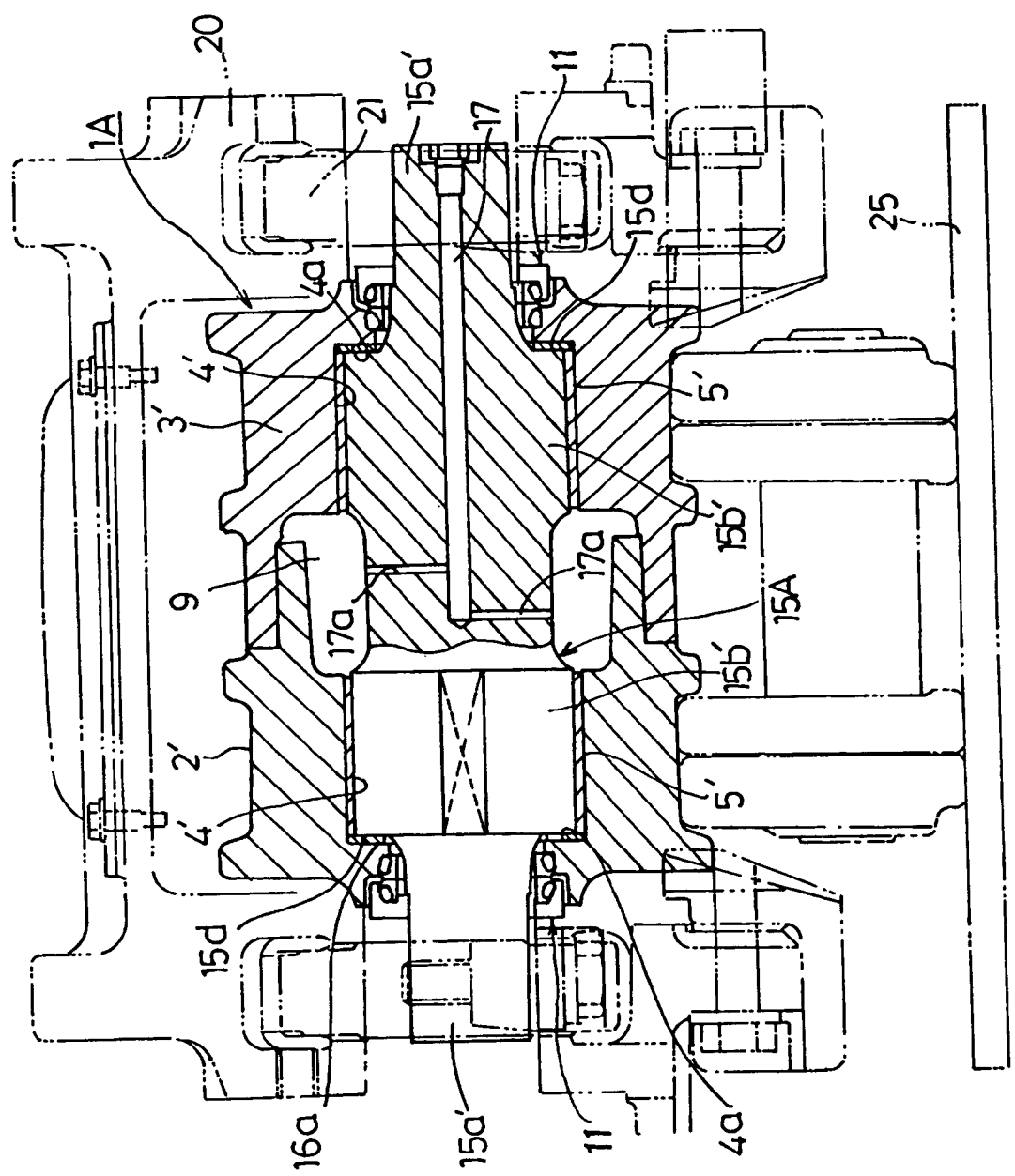
FIG. 3 is a longitudinal sectional view of a roller in accordance with a second exemplary embodiment of this invention.

FIG. 3 is a longitudinal sectional view of a roller in accordance with the second exemplary embodiment of the present invention. Roller 1A of this embodiment is similar in basic structure to that of the first embodiment, but differs from the first embodiment in the following points. Respective shaft holes 4', 4' of separable left and right roller pieces 2', 3' each have a step about its outer side. Bearing bushes 5', 5' are each fitted to an inner periphery of each of these stepped shaft holes 4', 4', and thrust bearing 16a is provided between step 4a of shaft hole 4' and end face 15d of large-diameter shaft part 15b'. Support shafts 15a' corresponding to respective end parts of support shaft 15A have normal diameters, and large-diameter shaft part 15b' is a part supporting the rotation of roller 1A. It is to be noted that elements similar to those in the first embodiment have the same reference marks, and the descriptions of those elements are omitted.

Roller 1A of the second embodiment has the following advantages. The end parts of support shaft 15A are each machined thinly and cut to a required size, so that workability is good. Since the rotation supporting part corresponding to bearing bushes 5' between roller pieces 2', 3' and support shaft 15A can be made larger, rotational performance improves.

Figure 4:
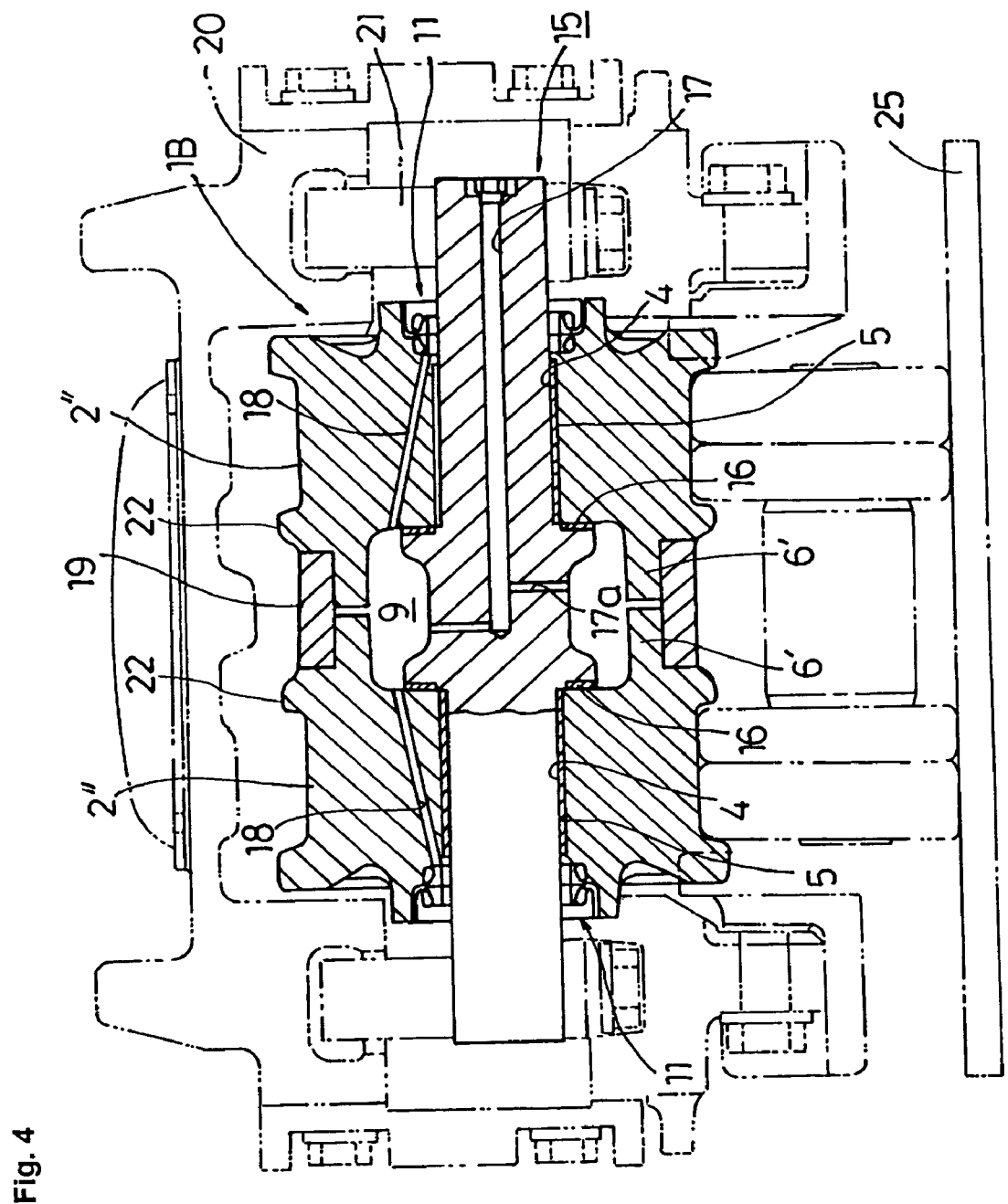
FIG. 4 is a longitudinal sectional view of a roller in accordance with a third exemplary embodiment of this invention.

FIG. 4 is a longitudinal sectional view of a roller in accordance with the third exemplary embodiment of the present invention. Roller 1B of this embodiment is similar in basic structure to that of the first embodiment, but differs in the following points. Separable left and right roller pieces 2" have the same shape and are formed integrally by press fitting in a different manner. It is to be noted that elements similar to those in the first embodiment have the same reference marks, and the descriptions of those elements are omitted.

In the case of roller 1B of the third embodiment, connecting ring (ring member) 19, having a required size corresponding to the press fit specifications mentioned-earlier, and which is to be located around stepped engagement parts 6', 6' of left and right roller pieces 2", 2" is first press-fitted to stepped engagement part 6' of one of roller pieces 2" over a specified length by a press. Next, in the same manner as in the first embodiment, support shaft part 15a of support shaft 15 is inserted into bearing bush 5 of roller piece 2" provided with connecting ring 19 with thrust bearing 16 interposed between end face 15c of large-diameter shaft part 15b and inner end face 8a of roller piece 2". Subsequently, bearing bush 5 of the other roller piece 2" is fitted on the other support shaft 15a with the other thrust bearing 16 interposed in the same manner as the above, and thereafter, press fit force is applied to latter slid roller piece 2" for press fitting, whereby stepped engagement part 6' of this latter roller piece 2" is press-fitted in connecting ring 19. In this way, roller pieces 2" are formed integrally. In the third embodiment, each of roller pieces 2", 2" is provided with, at its inner end and at a base end of stepped engagement part 6', inner flange 22 for preventing roller 1B from coming off. Connecting ring 19 is press-fitted between these inner flanges 22.

Left and right roller pieces 2" of roller 1B of the third embodiment that are used are formed to have the same shape and are coupled together and formed integrally by press fitting using connecting ring 19. With connecting ring 19 and stepped engagement parts 6', 6' of roller pieces 2", 2" provided with respective press fit lengths required for coupling, the intended object can be accomplished. It is thus preferable that the length of stepped engagement part 6' is shorter than a half of the width (length) of connecting ring 19.

Although connecting ring 19 is required, compared with cases where the roller pieces are directly fitted to each other, roller 1B of the third embodiment has improved productivity when mass-produced because left and right roller pieces 2", 2" of the same shape can be used. In other words, with the use of the common elements, the variety of elements can be reduced, thus furthering streamlining. It is a matter of course that the cost of manufacture can be reduced, whereby costs can be reduced.

Figure 5:
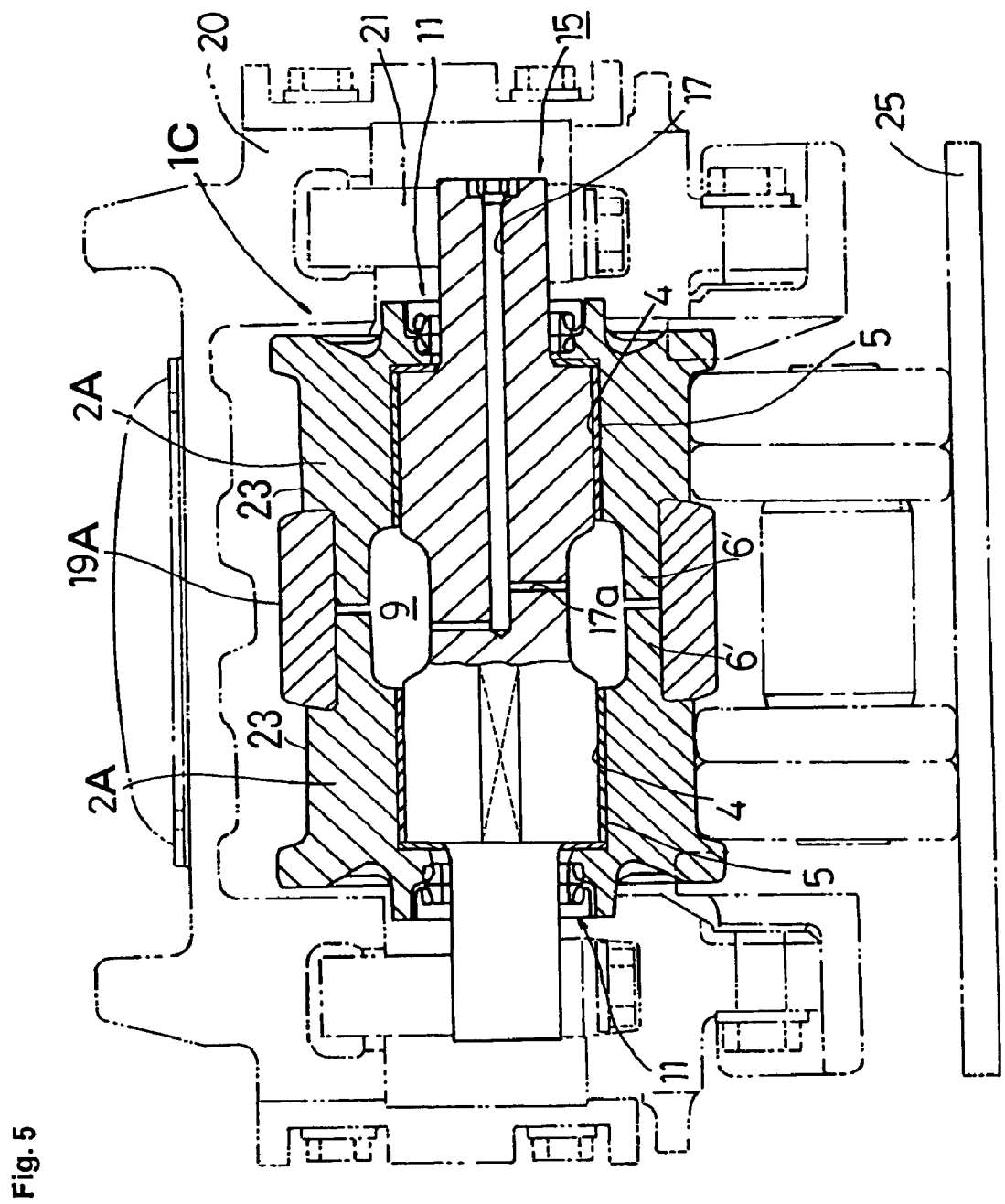
FIG. 5 is a longitudinal sectional view of a roller in accordance with a fourth exemplary embodiment of this invention.
Figure 6:
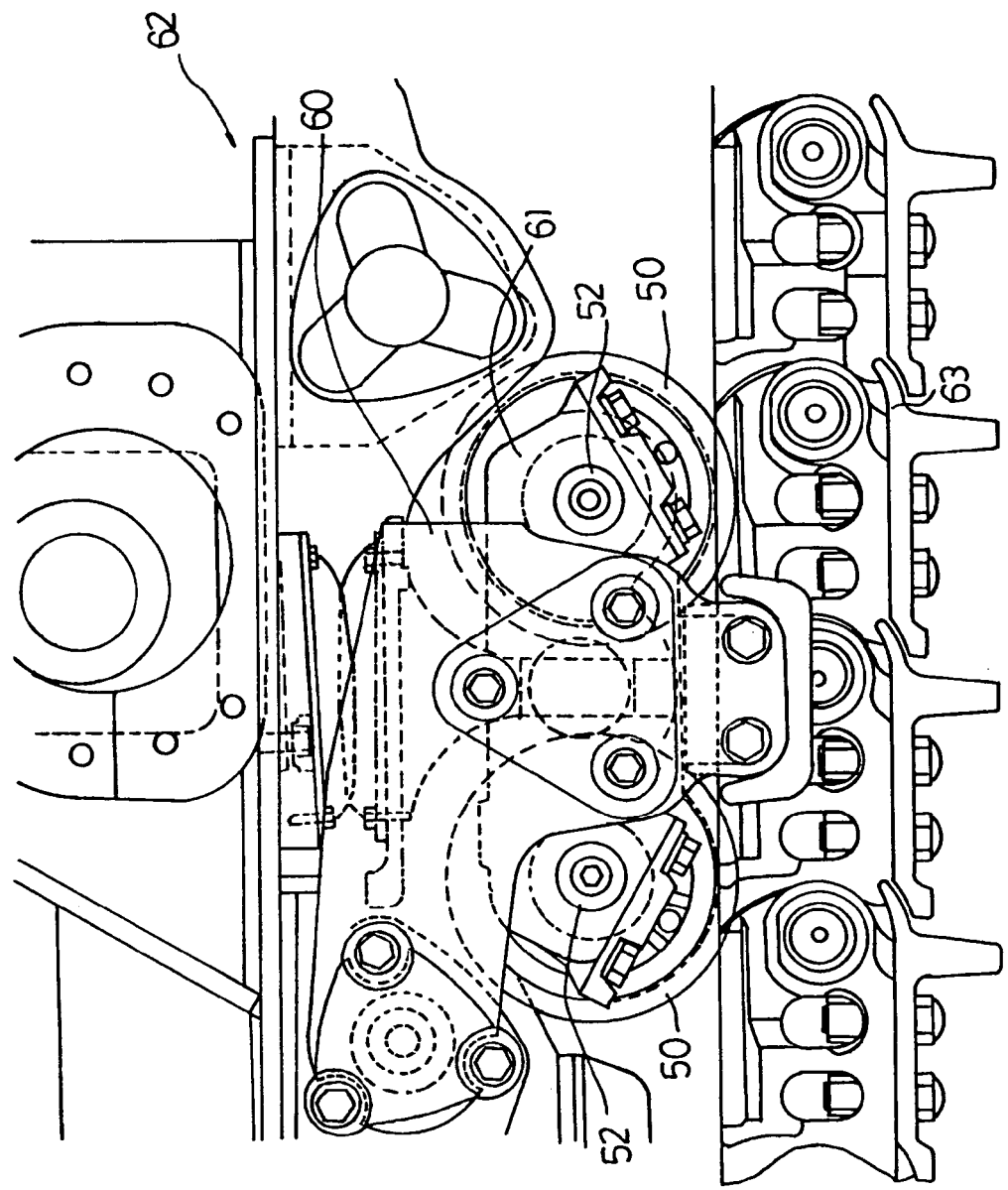
FIG. 6 is a side view of conventional rollers.
Figure 7:
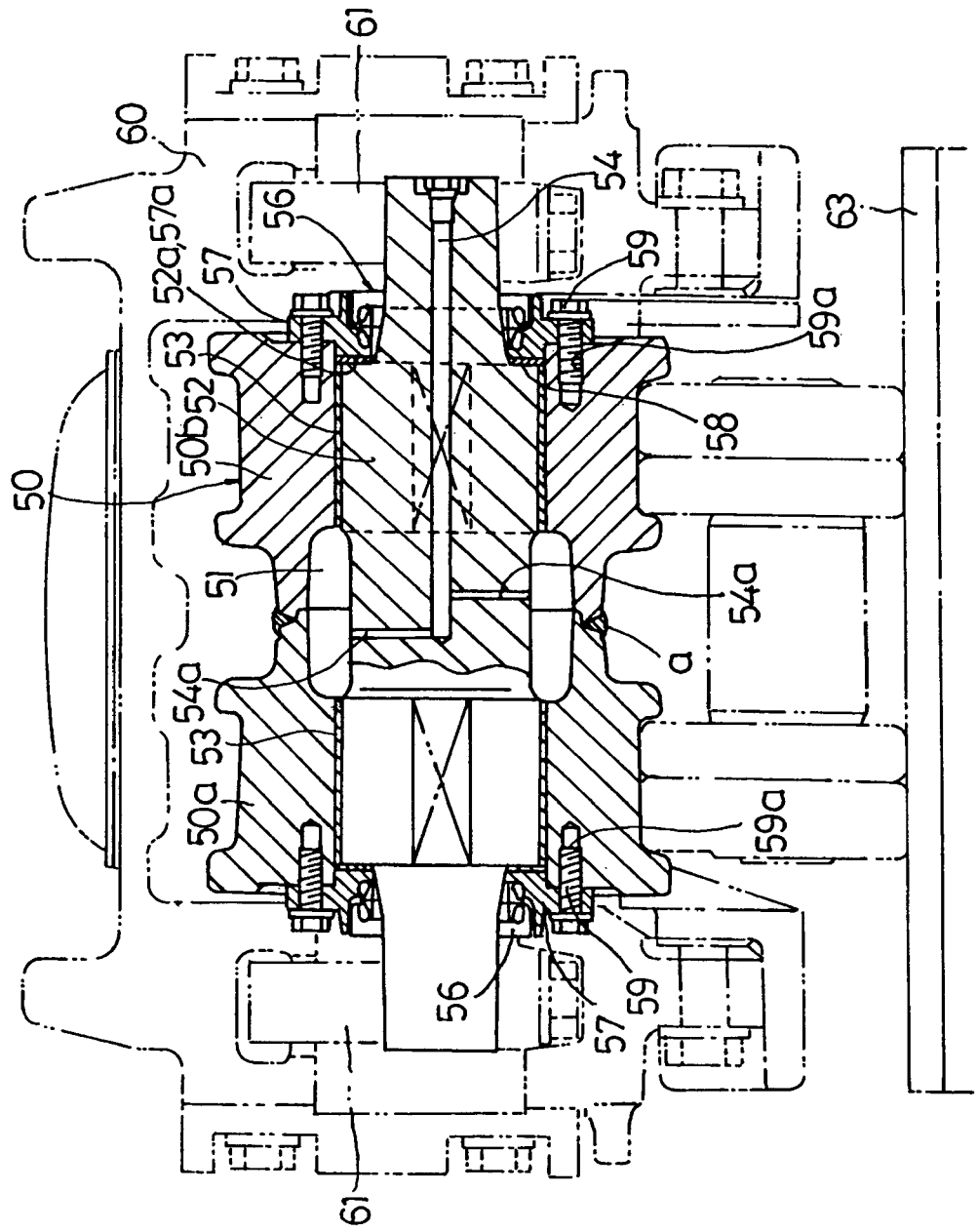
FIG. 7 is a longitudinal sectional view of the conventional roller.

FIG. 5 is a longitudinal sectional view of a roller in accordance with the fourth exemplary embodiment of the present invention. Roller 1C of this embodiment is similar in basic structure to that of the third embodiment, but differs in the following points. Each of roller pieces 2A, 2A has no inner flange at its inner end, while connecting ring 19A has more thickness than that of the third embodiment, thus projecting outward from rolling contact surface 23 and extending axially to also serve as an inner flange.

Since roller pieces 2, 2', 2" of the first through third embodiments are double flange roller type pieces each having an outer flange and the inner flange, it is necessary in manufacture of these roller pieces 2, 2', 2" that a portion between these flanges be removed by machining after formation of a forging having an outer peripheral surface flush with an outer peripheral surface of the inner flange or that the inner flange be bent with the press after formation of a forging. On the other hand, roller piece 2A of the fourth embodiment can be produced only by forging, so that the above-mentioned machining or pressing process step is unnecessary. The working process can thus be extremely simplified, whereby costs can be reduced. Moreover, connecting ring 19A has longer press fit length than that of the third embodiment, thus having increased power for holding roller pieces 2A, 2A and enhancing the effect of preventing roller pieces 2A, 2A from coming off.

In each of the foregoing embodiments, the support shaft directly incurs the thrust load caused between the support shaft and each of the roller pieces, and the floating seal, which seals to prevent outward leakage of the oil supplied to the rotation supporting part, is incorporated to fit in the outer face section of the rotary wheel (roller). These embodiments can thus provide a simplified structure, eliminating a conventional complicated structure in which a piece for holding a seal and a thrust bearing is bolted.

It goes without saying that the roller of each of the foregoing embodiments is applicable to not only a track roller but also a carrier roller.

What is claimed is:

1. A roller for a crawler type traveling vehicle, the roller comprising:
   roller pieces shaped to be axially separable at a parting section, wherein
   the parting section is formed of stepped engagement parts formed at respective ends of the roller pieces; and
   the roller pieces are combined with a support shaft and press-fit connected and held together by frictional contact to a ring member disposed on the outer surface of the stepped engagement parts having a required width.

2. A roller for a crawler type traveling vehicle, the roller comprising:

roller pieces shaped to be axially separable at a parting section; wherein the roller pieces are combined with a support shaft and press-fit connected and held together by frictional contact at the parting section by press fitting; and the parting section is formed of a stepped engagement part formed at one end of one of the roller pieces, and an external engagement part that is formed at one end of the other roller piece and fits on the outer surface of the stepped engagement part.

3. A roller for a crawler type traveling vehicle, the roller comprising:

roller pieces shaped to be axially separable at a parting section, wherein the parting section is formed of stepped engagement parts formed at respective ends of the roller pieces; and the roller pieces are combined with a support shaft and press-fit connected and held together by frictional contact o a ring member disposed on the outer surface of the stepped engagement parts having a required width, the ring member is shaped to project outward from a rolling contact surface and extend axially, thereby to also serve as an inner flange for preventing the roller from coming off of a crawler belt.

4. The roller for a crawler type traveling vehicle according to claim 1, wherein the roller pieces each include, at a base end of the stepped engagement part, an inner flange for preventing the roller from coming off a crawler belt.

5. The roller for a crawler type traveling vehicle according to claim 1, 2, or 3, wherein the support shaft is provided with a projection for restraining the roller pieces from moving in an axial direction, and a thrust bearing is provided between an axially end face of the projection and a contact face of each of the roller pieces.

6. The roller for a crawler type traveling vehicle according to claim 1, 2, or 3, wherein the support shaft is provided with a seal mechanism at an outer part thereof, and the seal mechanism is incorporated to have a part, which is closer to the roller piece, provided to be fitted into an outer section of the roller piece and a part, which is closer to the support shaft, held to the support shaft by a retainer.

7. The roller for a crawler type traveling vehicle according to claim 6, wherein the seal mechanism is a floating seal.

8. The roller for a crawler type traveling vehicle according to claim 1, wherein the stepped engagement parts are formed to be of equal size.

* * * * *